Oct. 17, 1950 L. HAMMOND 2,525,900
LEVEL FLIGHT CONTROL APPARATUS
Filed Sept. 15, 1945 3 Sheets-Sheet 1

Inventor
Laurens Hammond
By Benjamin J. Nupper
Atty.

Oct. 17, 1950     L. HAMMOND     2,525,900
LEVEL FLIGHT CONTROL APPARATUS
Filed Sept. 15, 1945     3 Sheets-Sheet 2

Inventor
Laurens Hammond
By Benjamin J. Nupper
Atty.

Oct. 17, 1950 — L. HAMMOND — 2,525,900
LEVEL FLIGHT CONTROL APPARATUS
Filed Sept. 15, 1945 — 3 Sheets-Sheet 3

Inventor
Laurens Hammond
By Benjamin F. Nupper
Atty.

Patented Oct. 17, 1950

2,525,900

UNITED STATES PATENT OFFICE 2,525,900

LEVEL FLIGHT CONTROL APPARATUS

Laurens Hammond, Chicago, Ill., assignor to Hammond Instrument Company, Chicago, Ill., a corporation of Delaware Application September 15, 1945, Serial No. 616,602

11 Claims. (Cl. 244—77)

My invention relates generally to aircraft control apparatus and more particularly to apparatus for automatically maintaining aircraft in level flight.

Automatic gyro pilot controls for aircraft in general do not have means for maintaining the aircraft in level flight at a given altitude. As a result of movements of the passengers and crew longitudinally of the aircraft, its center of gravity is shifted and such changes affect the pitch or angle of attack of the plane and interfere with level flight. For example, if a passenger walks from the front of the plane toward the tail thereof, the center of gravity of the plane and its contents is shifted rearwardly, thereby causing an increase in the pitch or angle of attack. If the pilot does not make any compensating correcting adjustments in the gyro pilot apparatus the plane will tend to gain altitude and correspondingly lose speed. Atmospheric conditions, such as changes in the direction of the relative wind, also result in changes of lift and consequent changes in the altitude. The pilot therefore finds it necessary, when piloting an aircraft in which people are moving about, or when flying in gusty weather, to pay attention continuously to the altimeter and rate of climb indicator, in order to maintain the aircraft at a desired constant altitude.

It is therefore the primary object of the invention to provide an improved apparatus whereby an aircraft is automatically maintained in level flight.

A further object is to provide an improved automatic level flight control apparatus in which the degree of correction applied to the elevator depends upon the extent of the deviation from level flight which has occurred.

A further object is to provide an improved automatic level flight control apparatus for aircraft in which there is provided damping means to prevent hunting of the controls.

A further object is to provide a flight control apparatus in which ascending flight may be maintained for a predetermined time interval, or until a predetermined altitude is obtained, and which will thereafter maintain the aircraft in level flight.

Other objects will appear from the following description, reference being had to the accompanying drawings in which.

Figure 1:
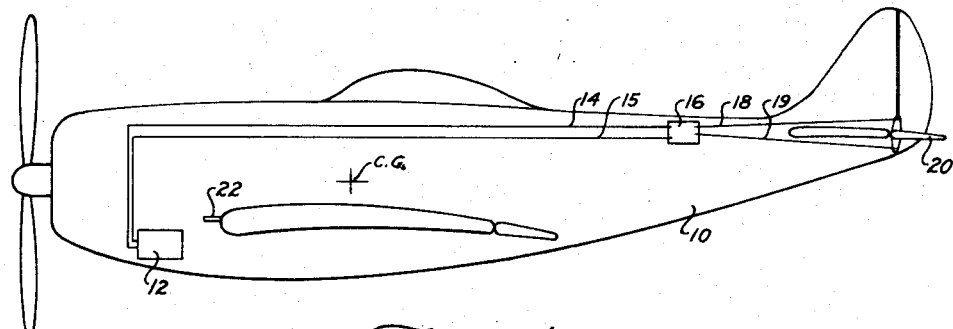
Figure 1 is a side elevational view of a conventionalized airplane illustrating diagrammatically the location of the components of the improved level flight control apparatus.

Referring to Fig. 1, the control apparatus is diagrammatically illustrated as applied to a conventionalized airplane 10 having a control box 12 mounted forwardly of its center of gravity CG. The control box is connected by conductors 14 and 15 to a servo motor mechanism 16 which, through control cables 18 and 19, positions the elevator 20 or positions an elevator tab. The airplane is provided with the usual Pitot tube 22 for the air speed indicator which provides air pressure which is the sum of the atmospheric and velocity pressures. The static pressure tube customarily supplied with the Pitot tube is not used in the apparatus of the invention.

If desired, a separate tube may be provided for operating the apparatus. Such tube should be open at the forward end whereby the air pressure in the tube will be that of the atmosphere plus an increased pressure due to the velocity of the airplane. The velocity pressure increase above the atmospheric pressure need not be the true velocity pressure as is necessary for operating air speed indicators. Thus any small opening pointed forward at almost any part of the airplane will be satisfactory as long as the connection gives a pressure which is normally greater than the cabin pressure.

When in the specification and claims I refer to the velocity pressure, I mean the pressure delivered by such connection. The true atmospheric component of pressure is sufficient to operate this equipment and to maintain constant altitude of flight and the added component of pressure due to velocity merely improves the operation.

Figure 2:
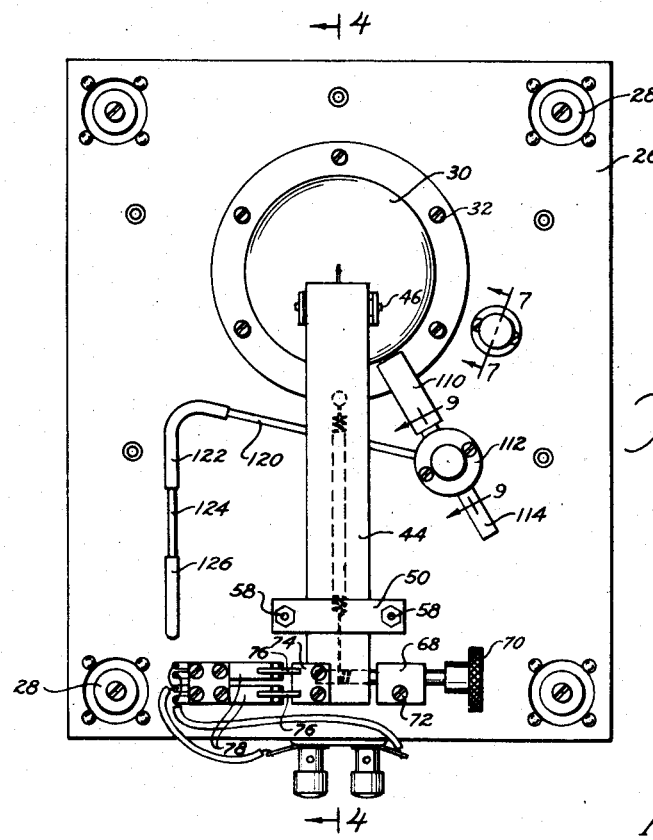
Figure 2 is a plan view of the level flight control box.
Figure 3:
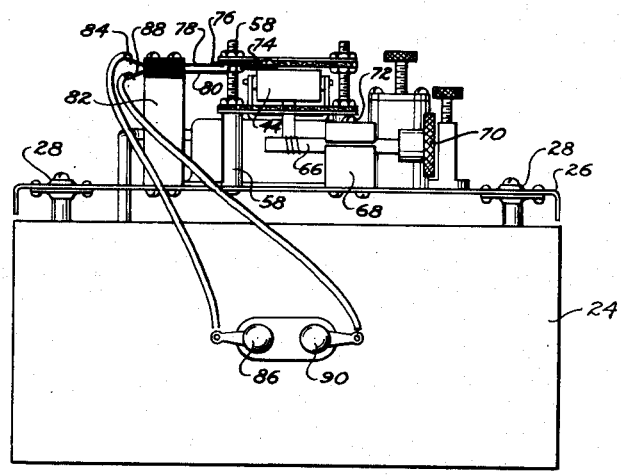
Figure 3 is an end elevational view of the flight control box.
Figure 4:
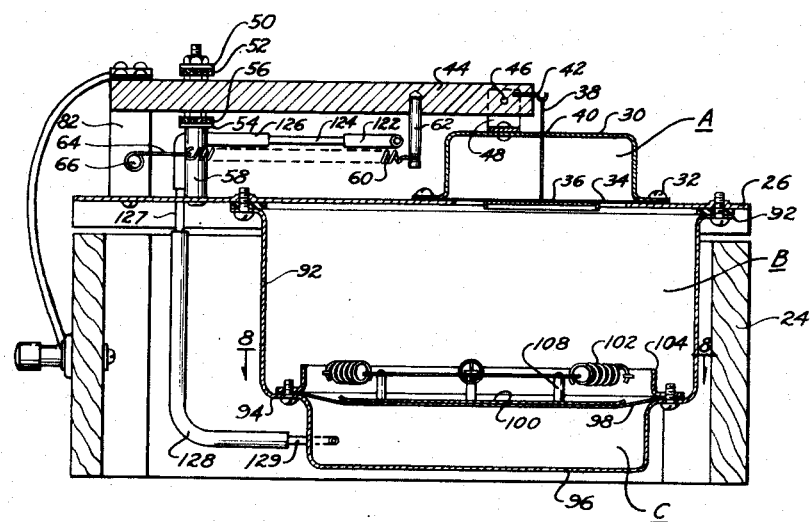
Figure 4 is a longitudinal sectional view of the flight control box taken on the line 4—4 of Fig. 2.

As best shown in Figs. 2, 3 and 4, the control box comprises a rectangular box-like frame 24 upon which a plate 26 is mounted by means of suitable vibration absorbing mountings 28 (Fig.

3) including parts of rubber or the like. A flanged inverted cup 30 is secured to the plate 26, as by screws 32, the peripheral edge of a diaphragm 34 acting as a gasket to seal this connection. A diaphragm reinforcing plate 36 is located centrally of the diaphragm 34 and at its center has a fine wire 38 secured thereto, this wire extending through a hole 40 in the top of the inverted cup 30 with very little clearance and having its upper end secured to a hook 42 projecting from the end of a relatively heavy arm 44. The arm 44 is pivoted freely on a pin 46 carried by a bracket 48, the latter being secured to the top of the inverted cup 30. Pivotal movement of the arm 44 is limited by an adjustable up stop bar 50 having a felt buffer 52 thereon. Similarly, the downward swinging movement of the arm 44 is limited by an adjustable down stop bar 54 having a felt buffer facing 56. The stop bars 50 and 54 are mounted upon threaded studs 58 riveted to the plate 26.

A tension coil spring 60 has one end secured to a pin 62 fixed to the arm 44 and projecting downwardly therefrom and its other end hooked to a cord 64 which is wound upon a pin 66 frictionally secured in a split block 68 and having an adjusting knurled knob 70 at its end. When the knob 70 has been rotated to place the spring 60 under the desired tension, the pin 66 may be clamped in adjusted position by tightening a screw 72 threaded in the split block 68. The force of the spring 60 upon the arm 44 is partially opposed by an excess of pressure on the upper surface of the elastic diaphragm 34.

The arm 44 has an insulating switch actuator 74 secured thereto and located beneath projections 76 welded to flexible switch arms 78. The latter cooperate with relatively fixed and rigid switch arms 80 (Fig. 3), the switch arms 78 and 80 being mounted in suitable insulated relation upon a post 82 secured to the plate 26. The switch arms 78 are both connected to a conductor 84 which leads to a terminal post 86 while the switch arms 80 are both connected by a conductor 88 to a terminal post 90. The double contact provided by the switch arms 78, 80 assures reliability in operation.

It will be seen that when the arm 44 swings upwardly (clockwise Fig. 4) its switch actuator 74 (Fig. 3) will engage the switch arm extensions 76 and flex the switch arms 78 upwardly away from the switch arm 80 to break any circuit connected to the terminals 86, 90. The adjustment of the tension of the spring 60 is preferably made such that, under static conditions it exerts a force which is almost sufficient to raise the arm 44 to its mid-position intermediate its up and down stops. When in mid-position the switch actuator 74 will, upon the slightest upward movement, open the switch formed by the switch arms 78 and 80. Under these circumstances, if the arm 44 is uniformly oscillated, the switch 78, 80 will be closed during one half of the cycle.

Figure 8:
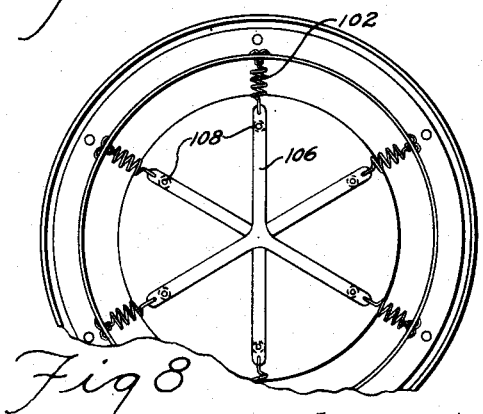
Figure 8 is a fragmentary sectional view taken on the line 8—8 of Fig. 4.

A flanged cup 92 is secured to the plate 26 beneath the diaphragm 34 and has an inwardly extending annular shoulder 94 and a smaller diameter bottom portion 96. Suitably secured to the annular shoulder portion 94 is a flexible diaphragm 98 having a circular reinforcing plate 100. The diaphragm 98 is biased to a downwardly flexed position by a plurality of radial tension coil springs 102 (Figs. 4 and 8) the outer ends of which are anchored in a flanged ring 104 which also serves as the means for clamping the peripheral edge of the diaphragm 98 to the shoulder portion 94. The inner ends of the springs 102 are hooked to the ends of the arms of Y-shaped spider elements 106 which are secured to the plate 100 by being riveted to the ends of posts 108 which are also riveted to the plate 100.

For convenience, the space within the inverted cup 30 and above the diaphragm 34 will be referred to as space A, the space within the large diameter portion of the cup 92 between the diaphragms 34 and 98 will be referred to as the space B, and the space in the reduced diameter portion 96 and beneath the diaphragm 98 will be referred to as the space C.

As best shown in Fig. 2, the space A is connected by a hose 110 to a hollow valve body 112 (Fig. 9) which is in free communication with a nipple 114, the latter being adapted to be connected to the velocity pressure line of the air speed indicator head. A suitably faced valve disc 116 is swiveled on the lower end of a stem 118 threaded in the valve body 112 and cooperates with a valve seat 119 having a ported passageway leading into space B. Also leading into the valve body 112, and thus transmitting the velocity pressure, is a metal tube 120 which is connected by a rubber tube 122, a restricted metal tube 124, a rubber tube 126, a metal tube 127, a rubber tube 128, and a metal tube 129, to the reduced diameter portion 96 of the cup 92, thus communicating the velocity pressure to the space C. By virtue of the rubber tube connections, the metal restriction tube 124 may readily be disconnected and a tube having a restriction of different size substituted for adapting the apparatus to different types of aircraft.

If desired, a suitable adjustable needle valve may be substituted for the restriction tube 124.

Figure 7:
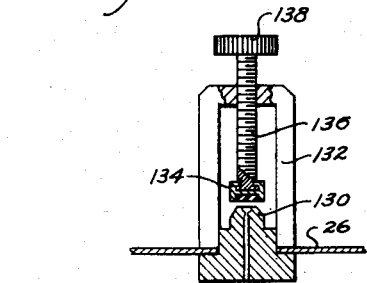
Figure 7 is a fragmentary sectional view taken on the line 7—7 of Fig. 2.

As shown in Fig. 7 a valve seat nipple 130 secures a valve yoke 132 to the plate 26. A suitably faced valve disc 134 is swiveled on the lower end of a stem 136 which is threaded in the valve yoke 132, the stem 136 terminating in a manually engageable knob 138. Instead of being manually operable, this valve may be solenoid operated for purposes hereinafter described.

Figures 6, 9:
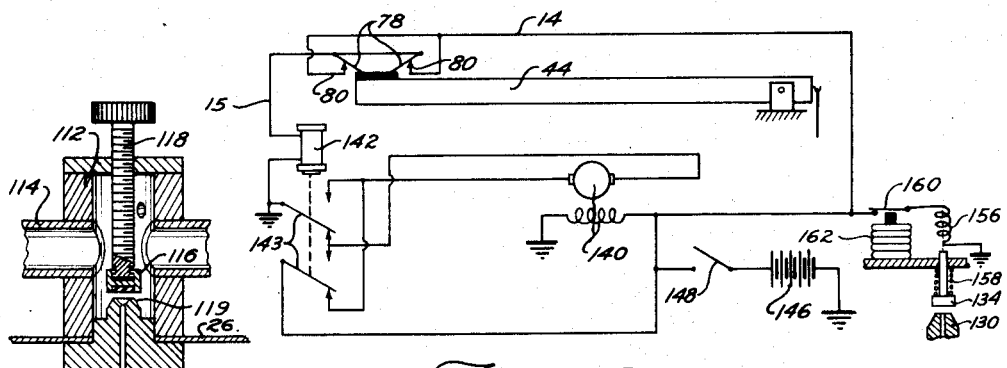
Figure 6 is a schematic wiring diagram of the electrical portions of the apparatus.
Figure 9 is a fragmentary sectional view taken on the line 9—9 of Fig. 2.

Figure 6 illustrates a simplified schematic wiring diagram in which a shunt field motor 140 is adapted to have its direction of rotation controlled by a relay 142 having double pole double throw reversing switch 143. When the relay is deenergized, current from a suitable source, illustrated as a battery 146, controlled by a main on-off switch 148, is adapted to flow through the armature of motor 140 in one direction whereas when the relay 142 is energized, the current flow through the armature will be in the opposite direction to cause a reversal in the direction of rotation of the motor. The winding of relay 142 is in series with the switch formed by the switch arms 78 and 80. The motor 140 forms part of the servo control 16 (Fig. 1) by which the elevator 20 is operated. Through usual mechanism such as speed reducing gearing and a capstan mechanism the control cables 18, 19 pull in opposite directions to change the position of the elevator 20, or of an elevator tab.

For automatically causing the plane to ascend to a given pressure-altitude and thereafter continue level flight, a solenoid 156 is provided for the valve 134, and the latter is biased to closed position by a spring 158. This valve, when open, affords a restricted passageway for the relatively slow leakage of air from the space B. Energization of the solenoid 156 is controlled by a normally closed switch 160 which is arranged to be opened at a predetermined pressure-altitude by a suitable static pressure responsive device conventionally illustrated as an evacuated aneroid bellows 162. The switch 160 is locked in open position whenever the apparatus is to be used on an ordinary pilot-controlled aircraft for maintaining the aircraft in level flight.

Figure 5:
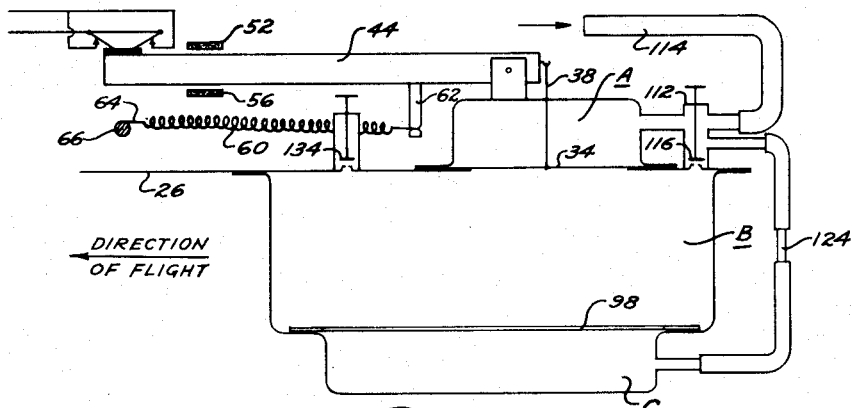
Figure 5 is a diagrammatic illustration of the control box to show the manner in which it operates.

The operation of the apparatus will be described with reference to the schematic diagram of Fig 5 in which the reference characters of the parts previously described are applied. In mounting the control box 12 in the airplane it is, as previously stated, preferably located well toward the nose of the aircraft and preferably has its arm 44 extending forwardly in the direction of flight.

Assume that the airplane is in trim level flight at a given altitude and it is desired to continue flying at this altitude. Under these circumstances, to render the apparatus operative automatically to maintain such level flight, the pilot will close valve 116. With the valve 134 open, the pressure in the space B will be greater than the pressure in the cabin of the plane, and air will leak slowly from the space B past this valve. This will cause the arm 44 to move substantially to mid-position. By closing the valves 134 and 116 a certain reference pressure is established in the space B, this pressure being a function of the altitude and relative air speed at the time that the valves are closed. Under these conditions, the arm 44 will, due to vibration and slight pitching movements of the airplane, be oscillating in a manner such that the switches 78, 80 will be closed and open one half the time.

If the airplane continues in level flight at constant altitude, this condition will be maintained and the motor 140 will therefore rotate in each direction during one half the time, with the result that there will be no cumulative effect on the position of the elevator 20. However, if a person in the airplane moves to the rear thereof, the shift in the center of gravity relative to the center of lift will cause an increase in the angle of attack, and, as a result, the lift increases and the plane is accelerated upwardly. Due to its inertia the arm 44 will swing downwardly and, as a result, the switch 78, 80 will remain closed during more than one half the time and through energization of the relay 142 during more than half of the time cause the motor to rotate more than half the time in a direction which will depress the elevator 20. This will tend to cause the nose of the plane to tilt downwardly and decrease the angle of attack of the airplane and reduce the lift. Assuming that the airplane engines are delivering a constant thrust, under the assumed conditions, namely an increase in the angle of attack, the lift and drag will increase with a subsequent slight decrease in velocity, and increase in altitude. The decrease in velocity, as well as the increase in altitude will both cause a decrease in the dynamic or velocity pressure in the space A. Thus the diaphragm 34 will tend to flex upwardly and decrease the clockwise torque applied to the arm 44 through the wire 38, and thus will further tend to cause the switches 78—80 to remain closed for a greater proportion of the time. Due to this effect the elevator will be moved further in a direction to cause a decreased pitch or angle of attack. Due to the combined effects of inertia on the arm 44 and velocity pressure variations due to changes in speed of the plane and changes in altitude, the elevator will be operated in a manner to correct for such undesired changes in altitude with the result that the airplane will tend to continue level flight.

As a further illustration of the operation of the apparatus, assume that a passenger moves forwardly in the airplane, thus shifting the center of gravity of the airplane and its load forwardly. The resultant depression of the nose will cause the arm 44 to swing upwardly and hold the switches 78 and 80 open during more than half the time. Therefore, the cumulative effect of the rotation of the motor 40 will be to raise the elevator 20 and thereby apply a correction to the pitch of the aircraft tending to maintain level flight. If the irregularity which caused the plane to nose down continues for an appreciable length of time, the airplane will increase its velocity and the barometric pressure will increase. The combined effect of these increases of speed and barometric pressure will be reflected in an increased velocity pressure in the space A causing the diaphragm 34 to flex downwardly and apply an increasing clockwise torque to the arm 44, thus further increasing the proportion of the time that the switches 78—80 are open and applying an additional upward movement to the elevator 20 to cause the airplane to return to level flight at the altitude-pressure at which the valve 116 was closed.

As the operation has thus far been described, the apparatus might tend to hunt because such operation is inherently unstable and the stabilizing factors operating on the aircraft might not provide sufficient damping. It is therefore desirabel to provide means to damp the control system. This damping means comprises the passageway including the restriction tube 124, the space C and diaphragm 98. For example, under the initially assumed operating conditions, during which the center of gravity of the plane was shifted rearwardly and the angle of attack increased, the subsequent decrease in velocity pressure would be communicated gradually through the restriction tube 124 to the space C. The resultant downward flexing of the diaphragm 98 causes a decrease in pressure in the space B which, acting upon the diaphragm 34, lessens the effect of the decrease in pressure in space A. The restriction in the tube 124 is preferably of such value that the damping rate is in the order of 20% per second, that is, 20% of the difference in pressure of the air in spaces A and C will be relieved through the restriction tube 124 during each second. This damping rate may be varied to suit the aerodynamic characteristics of the particular airplane upon which the apparatus is installed.

Under the second assumed operating conditions, when the center of gravity was shifted forwardly and caused the plane to nose down, it is clear that the increased velocity pressure in space A will gradually be communicated to space C and will, in a measure, compensate for the increased effect of the velocity pressure upon the diaphragm 34 by causing the diaphragm 98 to flex upwardly and increase somewhat the pressure in space B. Thus the damping effect of the restriction tube 124 is effective under both of the operating conditions assumed.

While it has been assumed that the tendency of the plane to change its angle of attack was due to shift in the center of gravity in the airplane and load, as by a person moving about in the plane, it will be understood that such changes in the angle of attack may be caused by changes in the relative wind, either due to gusty atmospheric conditions, or to changes in the thrust due to changes in engine speed or propeller pitch. Irrespective of the cause of the change in the angle of attack, the apparatus will be effective to operate the elevator to introduce compensatory forces causing the airplane to reassume the level flight at the predetermined pressure altitude.

In the foregoing description of the operation of the apparatus, it was assumed that the valve 134 was closed at the start of the operation so that the amount of air in the space B remained constant after the valve 116 was closed. In certain uses of the invention, as for example, the flight control of a jet or rocket propelled aerial torpedo such as a "robot bomb," it is desirable to have the torpedo ascend to a predetermined altitude and thereafter continue level flight until shortly before it reaches the target. To accomplish this purpose, the switch 160 is initially closed and the valve 134 held open by the energized solenoid 156, thus permitting slow leakage of air from the space B, causing the latter space to be maintained substantially at the altitude-pressure. Then when a predetermined low altitude pressure is attained, the bellows 162 will expand to open switch 160, permitting the valve 134 to be closed by its spring 156. The valve 116 having been closed initially, the apparatus will, subsequent to the closure of valve 134, maintain the aerial torpedo in level flight, in the manner previously described, until the control is rendered ineffective by a suitable timing mechanism as the torpedo reaches its target.

In general, the parts of the apparatus are constructed to withstand low temperatures, vibration and shock. The diaphragms 34—98 are preferably made of a suitable synthetic rubberlike material, the physical properties of which are not materially altered by temperature changes.

While I have shown and described a particular embodiment of my invention, it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

I claim:

1. In an apparatus for automatic level flight control of an aircraft, the combination of a mass responsive to acceleration in a vertical direction, resilient means for opposing movement of said mass from a central position, an elevator positioning motor, means to cause said motor to operate in one direction when said mass is above its central position and in the opposite direction when said mass is below its central position, and means to apply a force to said mass in a vertical direction in response to a change in atmospheric pressure.

2. In an apparatus for automatic level flight control of an aircraft, the combination of a mass movable in response to acceleration in a vertical direction, a pair of stops limiting movement of said mass, resilient means for opposing movement of said mass and holding said mass in a position substantially centrally between said stops when not being accelerated in a vertical direction, an elevator positioning motor, means to cause said motor to operate in one direction when said mass is above its central position and in the opposite direction when said mass is below its central position, and means to apply a force to said mass in a direction to move it upwardly in response to an increase in the velocity pressure.

3. In an apparatus for automatic level flight control of an aircraft having aerodynamic means for controlling its pitch, the combination of a mass movable from a central position in response to slight changes in the pitch of the aircraft, resilient means opposing movement of said mass from its central position, a motor for operating said aerodynamic pitch controlling means, means responsive to the movement of said mass from its central position to cause said motor to operate in a direction to move said aerodynamic pitch controlling means in a direction to cause the aircraft to change its pitch in a sense opposite to that which caused movement of said mass from its central position, and an atmospheric pressure responsive means to apply a force to said mass in a direction such that the latter will tend, through the motor and pitch controlling means, to maintain the aircraft at a predetermined pressure altitude.

4. The combination set forth in claim 3 in which means are provided to exert a force upon said mass in a direction opposing the force applied to the mass due to inertia as the aircraft increases its pitch, the force supplied by said means increasing in response to increases in velocity pressure.

5. The combination set forth in claim 3 in which there are two chambers separated by a diaphragm, one of said chambers being maintained at a preselected substantially constant pressure and the other of said chambers being at the velocity pressure of the relative wind, and in which there is a force transmitting connection between the diaphragm and said mass operative to apply to said mass a force opposing the inertia of the mass upon an increase in the pitch of the aircraft, the magnitude of the force supplied through said connection increasing with increases in the velocity pressure.

6. The combination set forth in claim 3 in which said motor comprises a reversible electric motor and in which there is provided a switch determining the direction of the operation of the electric motor, said switch being closed while said mass is displaced from its central position in one direction and open when the mass is displaced from its central position in the opposite direction.

7. In an apparatus for automatic level flight control of an aircraft having aerodynamic means for controlling its pitch in flight, the combination of a mass movable from a central position in response to changes in pitch of the aircraft, resilient means opposing movement of said mass from its central position, a motor for operating said aerodynamic pitch control means, means responsive to the movement of said mass from its central position to cause said motor to move said aerodynamic pitch controlling means in a direction to cause the aircraft to change its pitch in a sense opposite to that which caused movement of said mass from its central position, means forming a pair of chamber A and B, a diaphragm separating said chambers A and B, manually controllable means for closing said chamber B from the surrounding atmosphere, means for applying atmospheric pressure to the chamber A, and an operating connection between said diaphragm and said mass, said connection being such as to apply a force to said mass increasing with increases in the atmospheric pressure and in a sense to oppose movement of the mass relative to the aircraft due to its inertia as the pitch of the aircraft decreases.

8. The combination set forth in claim 7 in which there is a chamber C adjacent the chamber B and separated therefrom by a movable diaphragm, and in which there is provided a highly restricted passageway transmitting the atmospheric pressure to chamber C, thereby to change the volume and pressure of the air within chamber B relatively slowly as the atmospheric pressure changes.

9. The combination set forth in claim 7 in which there is a passageway connecting the chamber B with the surrounding atmosphere, and in which there is provided a valve for closing said passageway.

10. In an apparatus for automatic level flight control of an aircraft having aerodynamic means for controlling its pitch, the combination of a mass movable from a central position in response to changes in the pitch of the aircraft, resilient means opposing movement of said mass from its central position, a motor for operating said aerodynamic pitch control means, means responsive to the movement of said mass from its central position to cause said motor to operate in a direction to move said aerodynamic pitch controlling means in a direction to cause the aircraft to change its pitch in a sense opposite to that which caused movement of said mass from its central position, and means applying a force to said mass increasing with increasing velocity pressure in a direction opposing the effect of inertia on said mass as the result of a decrease in the pitch of the aircraft.

11. In an apparatus for the automatic level flight control of aircraft having aerodynamic controls including an elevator, the combination of an arm having substantial mass and pivoted near one end thereof, stops to limit pivotal movement of said arm, resilient means holding said arm in a central position with respect to said stops, a switch operated by said arm, said switch being open when the arm is displaced from its central position in one direction and closed when the arm is displaced in the opposite direction, means controlled by said switch for moving said elevator in one direction when the switch is closed and in the opposite direction when the switch is open, means forming a pair of chambers A and B, a flexible diaphragm forming a common wall between said chambers, means for transmitting the velocity pressure of the relative wind to chamber A, an operative connection between said flexible diaphragm and said arm, manually controlled means for transmitting the velocity pressure of the relative wind to chamber B, means forming a chamber C, a flexible wall between chambers B and C, and a restricted passageway connecting chambers A and C.

LAURENS HAMMOND.

REFERENCES CITED

The following references are of record in the file of this patent:

UNITED STATES PATENTS

| Number | Name | Date |
|---|---|---|
| 1,997,412 | Fischel | Apr. 9, 1935 |
| 2,125,361 | Schwarzler | Aug. 2, 1938 |
| 2,169,982 | Manteuffel | Aug. 15, 1939 |
| 2,176,807 | Wunsch | Oct. 17, 1939 |

FOREIGN PATENTS

| Number | Country | Date |
|---|---|---|
| 619,055 | Germany | Jan. 11, 1934 |